United States Patent [19]

Hauptfleisch et al.

[11] Patent Number: 4,761,589
[45] Date of Patent: Aug. 2, 1988

[54] MINE HOIST CONTROL METHOD AND APPARATUS

[75] Inventors: Lindo Hauptfleisch; Klaus Katzy, both of Johannesburg, South Africa

[73] Assignee: Crucible Societe Anonyme, Luxembourg

[21] Appl. No.: 926,731

[22] Filed: Nov. 4, 1986

[30] Foreign Application Priority Data

Nov. 5, 1985 [ZA] South Africa ............ 85/8484

[51] Int. Cl.⁴ .............. H02P 5/46; H02P 1/54
[52] U.S. Cl. ................................ 318/51; 318/62
[58] Field of Search ............ 318/51, 53, 59, 60, 318/61, 63, 64, 66, 67, 68, 62

[56] References Cited

U.S. PATENT DOCUMENTS 3,226,618 12/1965 Evans ........................... 318/62
4,289,997 9/1981 Jung et al. ................. 318/51 X

FOREIGN PATENT DOCUMENTS 1469213 4/1977 United Kingdom ............ 318/60

Primary Examiner—Bentsu Ro
Attorney, Agent, or Firm—Fleit, Jacobson, Cohn & Price

[57] ABSTRACT

A method of controlling a pair of hoist motors comprises delaying one about to raise a load while allowing the other to lower its load until a steady speed is reached, and then raising the load with the first motor. The regenerative current from the motor lowering its load at steady speed is offset against the drive current required for the motor raising its load.

4 Claims, 1 Drawing Sheet

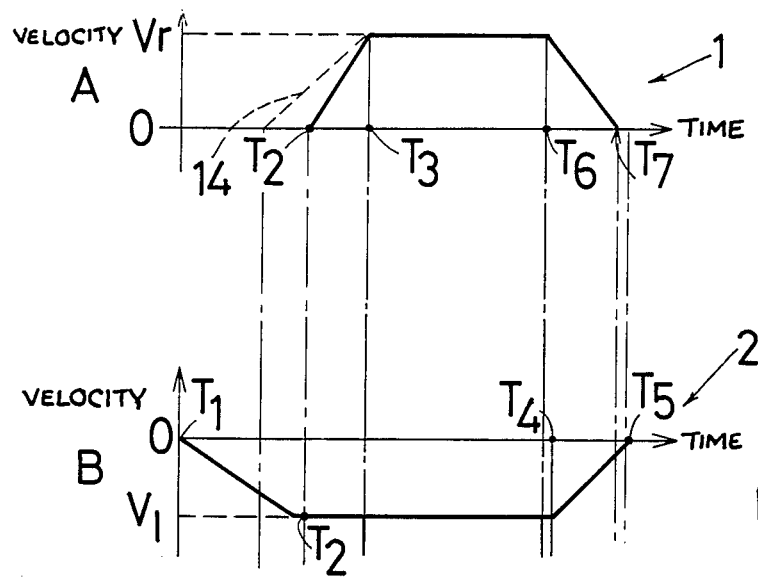
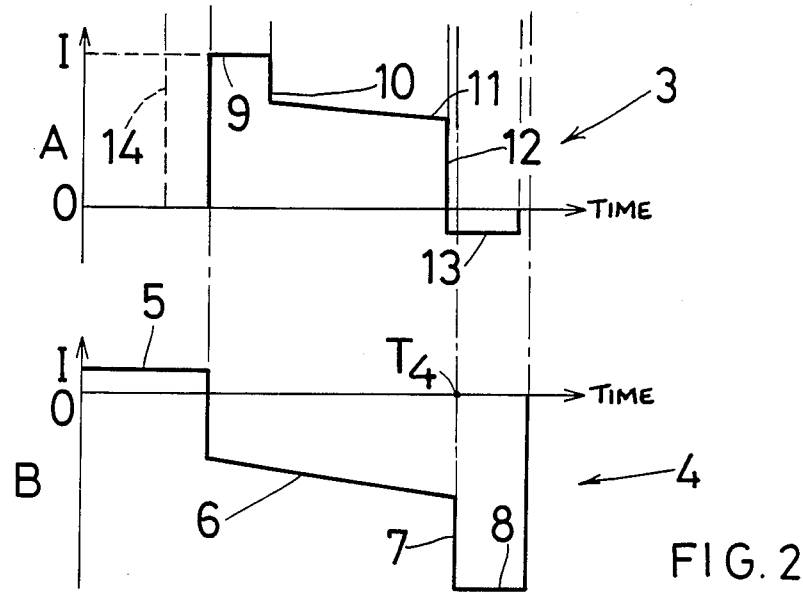
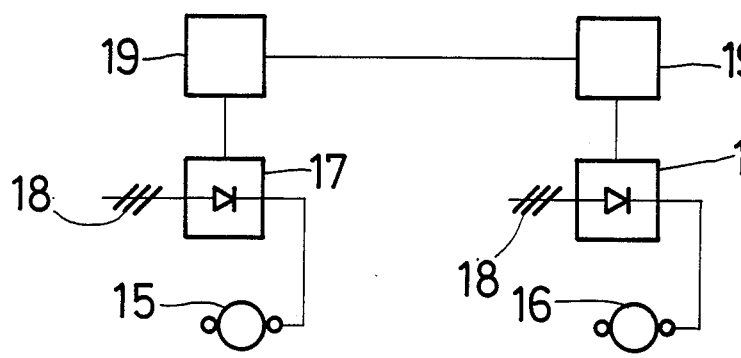
FIG. 1
FIG. 2
FIG. 3

1

MINE HOIST CONTROL METHOD AND APPARATUS

FIELD OF THE INVENTION

This invention relates to a method of and apparatus for controlling industrial drives.

BACKGROUND TO THE INVENTION

Such drives are used more particularly in mine hoists, and are often used in sets of two motors which drive shafts for one or more hoists. The hoists are normally operating synchronously, with one hoist being lowered as the other is raised, and the hoists are driven at the same speeds so that they arrive at their upper and lower destinations simultaneously. This method of controlling mine hoists is used particularly for rock hoisting.

The method suffers from a number of disadvantages. The hoist which is being raised requires a surge of current to the motor to accelerate it to the raising speed, whereas the hoist being lowered requires minimal acceleration and only draws a small current. Nevertheless the two currents occur at the same time and cause a considerable peak of current which is drawn from the main supply, and which causes a high power demand with resulting higher capital investment in the power supply network as well as higher electricity costs.

In addition thyristor converters used in the drives must be rated for a higher voltage in order to match the maximum permissible output voltage required during the regenerating mode which is lower than the maximum permissible voltage during the motoring mode. This results in a limited utilization of thyristor converter capacity during motoring mode which causes power factor reduction and necessitates the application of higher voltage rated thyristor converters.

Furthermore, the mechanical brake systems used in the hoists should be capable of handling high energy dissipation experienced during braking of the load being lowered at a relatively high speed.

OBJECT OF THE INVENTION

It is an object of this invention to provide a method of and apparatus for controlling industrial drives which will at least alleviate the above problems.

SUMMARY OF THE INVENTION

In accordance with this invention there is provided a method of controlling a set of first and second direct current motors driving separate shafts in a hoisting application, comprising delaying operation of the first motor, which is about to raise a load, and activating the second motor, which is about to lower a load, to accelerate until a desired lowering speed is reached, then activating the first motor approximately at the time of reaching of the desired lowering speed by the second motor, accelerating the first motor until a desired raising speed is reached, with the steady lowering speed being less than the steady raising speed, and causing deceleration of the motors as the raising and lowering is completed.

Where the delay time between activation of the second and first motors is longer than the normally expected loading time of a conveyance in the hoisting application, the first motor may be activated some time before a steady lowering speed of the second motor is reached, to reduce this delay. The invention extends to apparatus for performing the above method of the invention, comprising a set of at least first and second direct current motors driving separate shafts in a hoisting application, and control means adapted to delay operation of the first motor about to raise a load, and to activate the second motor about to lower a load to accelerate it until a desired lowering speed is reached, and further adapted to activate the first motor after reaching the desired lowering speed by the second motor to accelerate the first motor until a desired raising speed is reached, with the lowering speed being less than the raising speed and to cause or allow deceleration of the motors as raising and lowering is completed.

BRIEF DESCRIPTION OF DRAWINGS

A preferred embodiment of the invention, relating to mine hoists, is described below by way of example only, and with reference to the accompanying drawings, in which:

FIG. 1 is a set of graphs of hoist velocity against time for each motor of a set of two direct current hoist motors;

FIG. 2 is a set of graphs of current against time for the same set of hoist motors as in FIG. 1, and, FIG. 3 is a diagrammatic view of control aparatus for the motors of FIG. 1 and FIG. 2.

DETAILED DESCRIPTION OF DRAWINGS

Referring to FIG. 1, graph 1 indicates the velocity against time for a direct current hoist motor A and graph 2 indicates the graph of velocity against time for a direct current hoist motor B. Motor A is about to raise a loaded conveyance, and motor B is about to lower an empty conveyance.

The method of the invention provides for motor B to commence at time T1 to lower the load at an accelerating pace until time T2 when a velocity V1 is reached, being a steady lowering velocity. The conveyance continues to be lowered at the speed V1 until a time T4 when it approaches the lower destination, and commences deceleration to arrive at the underground destination at time T5.

Referring to graph 1, motor A is delayed by the time T2 minus T1 and commences raising its load at time T2 and accelerates until time T3 when it reaches a certain steady raising speed Vr. Vr is arranged to be somewhat higher than V1 as a scalar, so that for example the steady lowering would be 14 meters per second, and the steady raising speed 16 meters per second. After running at the steady raising speed the conveyance approaches the surface and at a time T6 commences deceleration and arrives at its surface destination at the time T7.

It is preferred that the delay time T2 minus T1 as well as the difference in the raising and the lowering speeds Vr and Vl, are arranged to cause T7 to be approximately equal to T5, which allows the conveyances to reach their destinations approximately simultaneously but the conveyance of motor A may also reach its destination before the conveyance of motor B.

It will be appreciated that this can be done since the conveyance which starts off first runs at a lower speed than the conveyance being raised and which starts off later but runs at a higher speed.

Referring now to FIG. 2, the effect of this timing cycle on the motor load currents can be seen. Graph 3 shows a graph of load current against time for motor A and graph 4 shows the correpsonding parameters for motor B. The graphs are placed on the same time axis as those of FIG. 1.

Referring to graph 4, motor B which commences first at time T1, requires an initial load current 5 which is small, in order to accelerate the conveyance to descend. On reaching the steady lowering speed at time T2, the current drawn decreases sharply as the motor is in an "idle" mode and causes regeneration of current which is fed back to the supply system.

The current is thus negative as shown by line 6 on the graph, and the regeneration increases as the weight of the rope being unwound increases. This position remains until time T4 when deceleration is required to allow the conveyance to come to rest at its underground destination, the deceleration causes an increase 7 in the regenerated current and approximately steady regenerative current 8 occurs during the ensuing deceleration time until time T5 at the end of lowering.

Referring now to graph 3, motor A commences operation at time T2 and immediately requires a high peak current load 9 in order to accelerate to raise the conveyance load to the steady running speed Vr. The acceleration phase is maintained until time T3 when the steady raising speed Vr is reached, and a current drop 10 occurs to an approximately steady current load 11, although this decreases slightly as the rope weight is wound in. This approximately steady current 11 endures during the steady raising speed cycle until time T6 when deceleration of the conveyance is necessary to bring it to a halt at the surface destination. A current drop 12 occurs at time T6 which would, if the conveyance is loaded, cause a regenerative cycle since the motor can be allowed to idle with the conveyance braking under its own load. This regenerative current is shown by numeral 13 and lasts until time T7 when the conveyance arrives at its surface destination, which in this case does not coincide with time T5.

Considering the graphs 3 and 4, it will be apparent that the result of the delay in starting times for the two hoist motors is that the high peak current demand at 9 is offset by the regenerative cycle 6 between the times T3 and T2, and this considerably lowers the peak current demand for the hoisting cycle, improves the power factor and allows for less expensive electricity supply equipment.

Furthermore, the provision of a lowering speed which is less than the raising speed of the motors has important advantages. First, less braking energy is required, since the heat dissipation is directly proportional to the square of the velocity, and any reduction in speed in either of the motors brings about a considerable saving in braking time since less heat has to be dissipated. A more powerful braking cycle is of course required in lowering the conveyance than in raising the conveyance, so that the lower lowering speed thus provides the maximum heat dissipation designed for the brake. However an empty conveyance being raised will require some regenerative braking at the end of the travel period.

The second advantage of the speed difference between raising and lowering lies in the capacity of the thyristor control design, if used. It will be appreciated by those skilled in the art that the closer the motors can run to the maximum control convertor voltage, the better is the power factor of power used.

Since the motor speed is directly proportional to its voltage, and since the regenerating absorption capacity of the converter circuit determines the maximum voltage capacity of the thyristor, the lower voltage requirement determined by the lower lowering speed allows the voltage on the raising cycle to operate closer to the permissible maximum. The reduced maximum thyristor voltage based on the lower lowering speed will still be sufficient for the proper operation of the unloaded down cycle.

Furthermore, as described above the use of the difference between steady raising and lowering speeds allows the time delay for offsetting the accelerating current peak, to be overcome, and thus no hoisting capacity is lost.

Referring to FIG. 3, a set of direct current hoist motors 15 and 16 are shown being driven through thyristor converters 17, from a main supply system 18. Each thyristor converter has a control input from a control system 19. It will be appreciated that this control system can control the converter to start up or decelerate at certain times, and can apply a required voltage to the motor. The controls are simply required to follow the graphs of FIGS. 1 and 2 in order to achieve the required time delay and the running speed. The technical details of the components and general operation of such apparatus will be within the knowledge of one skilled in the art.

It is considered that the invention provides a simple and effective method of and apparatus for controlling direct current hoist motors.

It can be that the delay time T2-T1 is uncomfortably longer than the loading time for the conveyances. The motor A can then be activated before the time T2 as indicated in dotted lines 14 in FIGS. 1 and 2. It will be appreciated that since power is a function of voltage and current, and voltage is directly proportional to speed, the maximum power consumption is not necessarily reached at full load current, but at T3 where speed and current are at a maximum.

What is claimed is:

1. A method of controlling a set of first and second direct current motors driving separate shafts in a hoisting application, comprising the steps of:
    delaying activation of the first motor, which is about to raise a load, and activating the second motor, which is about to lower a load;
    delaying activation of the first motor until a steady lowering speed of the second motor is reached;
    activating the first motor approximately at the time of reaching of the steady lowering speed by the second motor;
    accelerating the first motor until a steady raising speed is reached, with the steady lowering speed of the second motor being less than the steady raising speed of the first motor; and
    decelerating both motors until the raising and lowering are completed.

2. A method as claimed in claim 1 in which the delay time between activation of the second and first motors is longer than the normally expected loading time of a conveyance in the hoisting application, and the first motor is activated some time before the steady lowering speed of the second motor is reached.

3. A method as claimed in claim 1 in which the hoisting application is a pair of mine hoists, and the steady lowering speed is approximately 14 meters per second and the steady raising speed approximately 16 meters per second.

4. Apparatus for controlling a set of first and second direct current motors driving separate shafts in a hoisting application, comprising first and second direct current motors driving separate shafts, control means for delaying activation of the first motor about to raise a load, for activating the second motor about to lower a load to accelerate it until a desired lowering speed is reached, and further for activating the first motor after reaching the desired lowering speed of the second motor, for accelerating the first motor until a desired raising speed is reached, with the lowering speed of the second motor being less than the raising speed of the first motor, and for decelerating both motors until raising and lowering are completed.

* * * * *